L. LINK.
LENS MOUNTING.
APPLICATION FILED MAY 12, 1919.
1,328,441.
Patented Jan. 20, 1920.
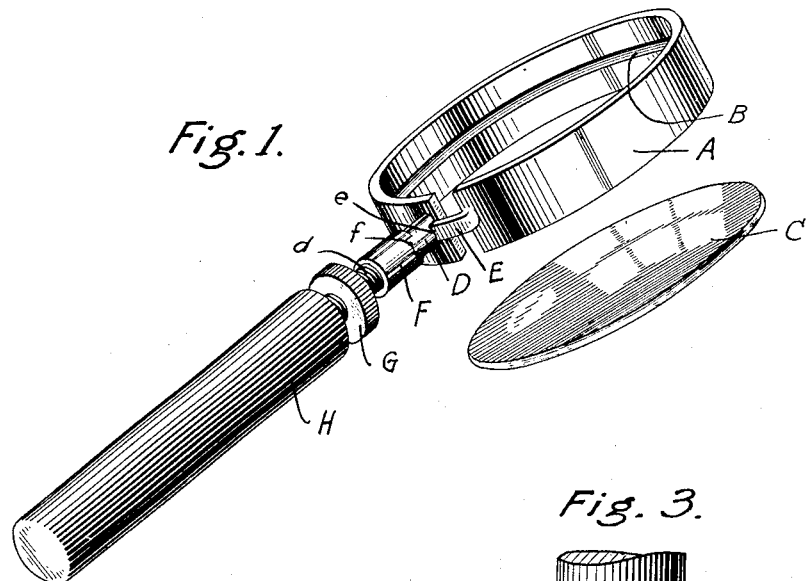
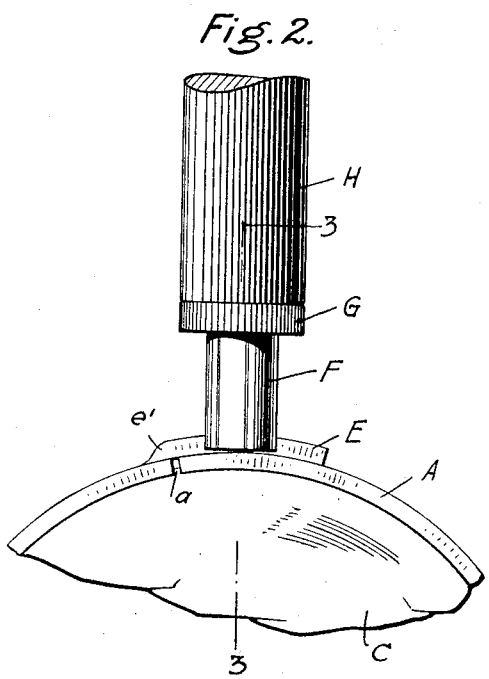
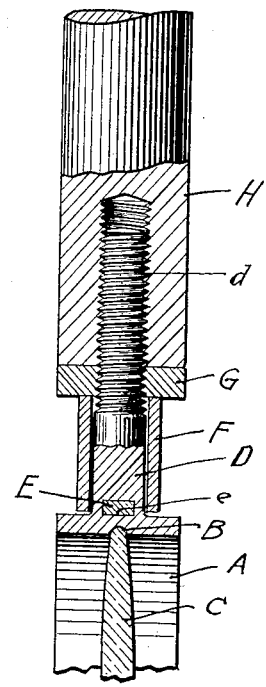
INVENTOR
Louis Link
BY Jas. H. Griffin
ATTORNEY

UNITED STATES PATENT OFFICE.

LOUIS LINK, OF NEW YORK, N. Y.

LENS-MOUNTING.

1,328,441.      Specification of Letters Patent.      Patented Jan. 20, 1920.

Application filed May 12, 1919. Serial No. 296,507.

*To all whom it may concern:*

Be it known that I, LOUIS LINK, a citizen of Hungary, (but having taken out my first naturalization papers in the United States and petitioned for my second papers,) residing in the city of New York, county of Bronx, and State of New York, have invented a certain new and useful Lens-Mounting, of which the following is a specification.

This invention is a lens mounting and is intended more particularly as a mounting for a reading glass though, manifestly, it is not restricted for this specific use.

As lenses of this character are usually mounted, they are supported in a split ring which is provided on its outer periphery and adjacent its free ends with complementary semi-cylindrical projections which are exteriorly threaded and adapted to be received within the interiorly threaded handle portion. The lens is introduced into the frame when the handle portion is removed therefrom, and, thereafter the ring is flexed to tightly grip the circumference of the lens and the handle portion screwed upon the threaded semi-cylindrical projections. This operation clamps the lens tightly into position within the split ring, and, simultaneously secures the handle in place. In order for a mounting of this character to be operative it is, of course, essential that the adjacent faces of the complementary semi-cylindrical projections be brought into face abutting positions otherwise the handle portion cannnot be screwed thereon. It is very common however, for lenses to vary slightly in diameter and not infrequently the lens is so large as to preclude its admission into the holder in the prescribed manner. In other instances where the lens is only slightly oversized the parts can be assembled with difficulty by placing undue tension on the split ring but in such instances the screwing of the handle portion into position results in excessive compression on the lens which invariably causes the checking of the outer periphery thereof. It is not uncommon to see reading glasses wherein the marginal portion of the lens is badly checked and in almost every instance this is due to the fact that the lens was slightly oversized and was checked during assembling or as a result of a slight knock or jar thereafter. The foregoing method of mounting a lens is not only open to the objections urged but is expensive to manufacture and requires skilled labor in its assembling.

With the foregoing considerations in mind the object of the present invention is to provide a lens mounting which will support lenses of slightly varying sizes in the proper manner and without fear of breakage and to so construct such a mounting that it may be as readily assembled by unskilled labor and the lenses replaced from time to time in the event of breakage due to sharp impacts such as would result in the dropping of the mounting on the floor.

Features of the invention, other than those specified, will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1 is a perspective view of a lens mounting embodying the present invention, the parts being shown in positions for assembling with a lens free from the mounting.

Fig. 2 is a face view of the mounting in assembled condition the portions thereof being broken away; and, Fig. 3 is a section on the line 3—3 of Fig. 2.

Referring to the drawings A designates a split ring parted at $a$ and provided on its inner periphery with a channel B forming a seat for a lens C. Mounted adjacent end of the split ring A and projecting radially therefrom is a post D rigidly secured to the ring and threaded at $d$. At the base of the post D an aperture $e$ is provided through which is adapted to extend a tongue E projecting from the other end of the ring and off set at $e'$ to bring the inner face of the tongue flush with the outer face of the opposite end of the ring.

F designates a sleeve positioned co-axially of the post D and longitudinally movable thereon. At the end of the sleeve F adjacent the ring, said sleeve is cut away or recessed at $f$ to straddle the tongue E and partake of the position shown in Fig. 2. Screwed upon the threaded post D is a nut G which, when screwed up against the sleeve F, forces it tightly against the tongue E with the result that the tongue E is tightly clamped against withdrawal from the opening $e$ in the post and the free ends of the ring A are locked against the relative circumferential movement so that the ends of the split ring have no tendency to spread. The handle H is screwed on to the outer end of the post and abuts the nut G and said handle, besides performing its usual function as such, serves the function of a lock nut to preclude the nut G from working loose and releasing the lens.

The nut G and handle H may be said to collectively form the handle portion of the mounting since, while it is preferred to use these two parts as described it is possible to omit the nut G and employ the handle H for forcing the sleeve F into clamping position without departing from the spirit of the invention.

It will clearly appear to those familiar with the art to which this invention pertains that the device may not only be readily assembled but that, should the lens become broken at any subsequent time, it may be as easily removed and replaced by a new one. Furthermore the holder may be associated with lenses of slightly varying sizes without affecting its operativeness or without fear of checking of a lens. In instances where a relatively large lens is employed the free ends of the ring may not entirely come together and there may be a slight space left which is, however not serious from either a utilitarian or aesthetic standpoint, as the tongue E is made sufficiently long to allow of such variation in lens sizes and still permit of its being tightly clamped in position by the handle portion.

It will be understood that mechanical and formal changes may be made in the structure described, such as the substitution of equivalents, without departing from the spirit or substance of the invention, the scope of which is commensurate with the appended claims.

Having thus fully described the invention, what I claim as new, and desire to secure by Letters Patent is:

1. A lens mounting embodying a split ring, in the inner periphery of which is a channel forming a seat for a lens, a tongue rigid with one end of the split ring and adapted to overlie the outer surface of the other end of said ring, and a handle portion, associated with the end of the split ring which the tongue overlies, and embodying means adapted to engage the tongue and force it into tight engagement with the portion of the ring which it overlies for the purpose of normally locking the ring against spreading, said handle portion being retractable to release the tongue from engagement with the portion of the ring which it overlies to allow of the removal of the lens.

2. A lens mounting embodying a split ring, the inner periphery of which is channeled to form a seat for a lens, a tongue rigid with one end of the split ring and projecting therefrom into a position in which it overlies the other end of said ring, a post projecting radially from one end of the ring, and means associated with the post, and adapted to engage the tongue, to force said tongue into tight frictional engagement with the portion of the ring which it overlies for the purpose of locking the ring against spreading.

3. A lens mounting embodying a split ring, the inner periphery of which is channeled to form a seat for a lens, a tongue projecting from one end of the split ring and adapted to overlie the other end of said ring, a threaded post projecting radially from one end of said ring, clamping means mounted for movement longitudinally on said post, and a handle portion screwed on to said post for forcing the clamping means into position to grip the tongue, whereby inadvertant relative movement between the free ends of the ring is precluded.

4. A lens mounting embodying a split ring, the inner periphery of which is channeled to form a seat for a lens, a threaded post carried by and extending radially outward from one free end of the ring and provided with an aperture, and a tongue projecting from the other end of the ring and adapted to extend through said aperture, in combination with a sleeve co-axial with said post, and a handle portion screwed on to the post and adapted to force the sleeve into position to tightly clamp the tongue against the withdrawal from the aperture in the post.

In testimony whereof, I sign my name to this specification.

LOUIS LINK.